(12) United States Patent
Chen

(10) Patent No.: US 10,499,702 B2
(45) Date of Patent: Dec. 10, 2019

(54) SMART MODULE FOR SMART SHOE

(71) Applicant: Goldtek Technology Co., Ltd., New Taipei (TW)

(72) Inventor: Chao-Shen Chen, New Taipei (TW)

(73) Assignee: Goldtek Technology Co., Ltd., New Taipei (TW)

( * ) Notice: Subject to any disclaimer, the term of this patent is extended or adjusted under 35 U.S.C. 154(b) by 0 days.

(21) Appl. No.: 16/158,110

(22) Filed: Oct. 11, 2018

(65) Prior Publication Data
US 2019/0281919 A1    Sep. 19, 2019

(30) Foreign Application Priority Data
Mar. 19, 2018  (TW) ............................. 107109343 A

(51) Int. Cl.
| | | |
|---|---|---|
| A43B 3/00 | (2006.01) | |
| H01Q 1/24 | (2006.01) | |
| H01R 31/06 | (2006.01) | |
| H05B 33/08 | (2006.01) | |
| H01R 13/66 | (2006.01) | |
| A43B 13/00 | (2006.01) | |
| G01S 19/36 | (2010.01) | |

(52) U.S. Cl.
CPC ............. *A43B 3/0005* (2013.01); *H01Q 1/24* (2013.01); *H01R 13/6675* (2013.01); *H01R 31/065* (2013.01); *H05B 33/0848* (2013.01); *A43B 13/00* (2013.01); *G01S 19/36* (2013.01)

(58) Field of Classification Search
CPC .. A43B 3/0005; A43B 13/00; H01R 13/6675; H01R 31/065; H05B 33/0848; H01Q 1/24; G01S 19/36
See application file for complete search history.

(56) References Cited

U.S. PATENT DOCUMENTS

| | | | | |
|---|---|---|---|---|
| 8,026,864 B2* | 9/2011 | Noro | ......................... | H01Q 1/24 343/700 MS |
| 8,869,428 B1* | 10/2014 | Zsolcsak | .................. | A43B 7/04 36/2.6 |
| 9,450,295 B2* | 9/2016 | Tsai | ....................... | H01Q 1/243 |

(Continued)

FOREIGN PATENT DOCUMENTS

| | | |
|---|---|---|
| CN | 104366901 B | 8/2016 |
| CN | 205671577 U | 11/2016 |

(Continued)

*Primary Examiner* — Brandon J Miller
(74) *Attorney, Agent, or Firm* — ScienBiziP, P.C.

(57) ABSTRACT

A smart module for a smart shoe includes a second cover, a first cover, an antenna, a circuit board, and a power supply unit. The second cover cooperates with the first cover to form a housing for receiving the antenna, the circuit board, and the power supply unit. The antenna and the power supply unit are electrically connected to the circuit board. The power supply unit supplies power to the circuit board and the antenna. The first cover includes at least one positioning member. The antenna includes at least one positioning hole. The circuit board includes at least one positioning hole. The positioning holes in the antenna and the circuit board align with and receive the positioning member of the first cover to ensure that the antenna and the circuit board are mounted at appropriate locations in the first cover. Therefore, the smart module facilitates easy assembly.

16 Claims, 8 Drawing Sheets

(56) References Cited

U.S. PATENT DOCUMENTS

| | | | |
|---|---|---|---|
| 2011/0234459 A1* | 9/2011 | Yabe | H01Q 1/243 |
| | | | 343/702 |
| 2013/0118039 A1* | 5/2013 | Peterson | A43B 3/0005 |
| | | | 36/103 |
| 2017/0214200 A1* | 7/2017 | Zhang | H01R 13/6315 |
| 2018/0132560 A1* | 5/2018 | Kim | A43B 3/0005 |
| 2018/0270901 A1* | 9/2018 | Charette | H01Q 9/42 |

FOREIGN PATENT DOCUMENTS

| | | |
|---|---|---|
| TW | M314535 | 7/2007 |
| TW | M562028 | 6/2018 |

\* cited by examiner

SMART MODULE FOR SMART SHOE

FIELD

The present disclosure relates to smart shoes, and more particularly to a smart module for a smart shoe, which is easy to assemble and has improved durability.

BACKGROUND

A smart shoe is a type of wearable device. The smart shoe includes a smart module that can record movement, distance/displacement, speed, and direction of a user using global positioning system (GPS). The smart shoe is suitable for recording and analyzing data generated by a user during running, hiking and other outdoor activities. However, the smart module may become damaged or reduced in performance by forces applied to the smart shoe.

Therefore, there is room for improvement within the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
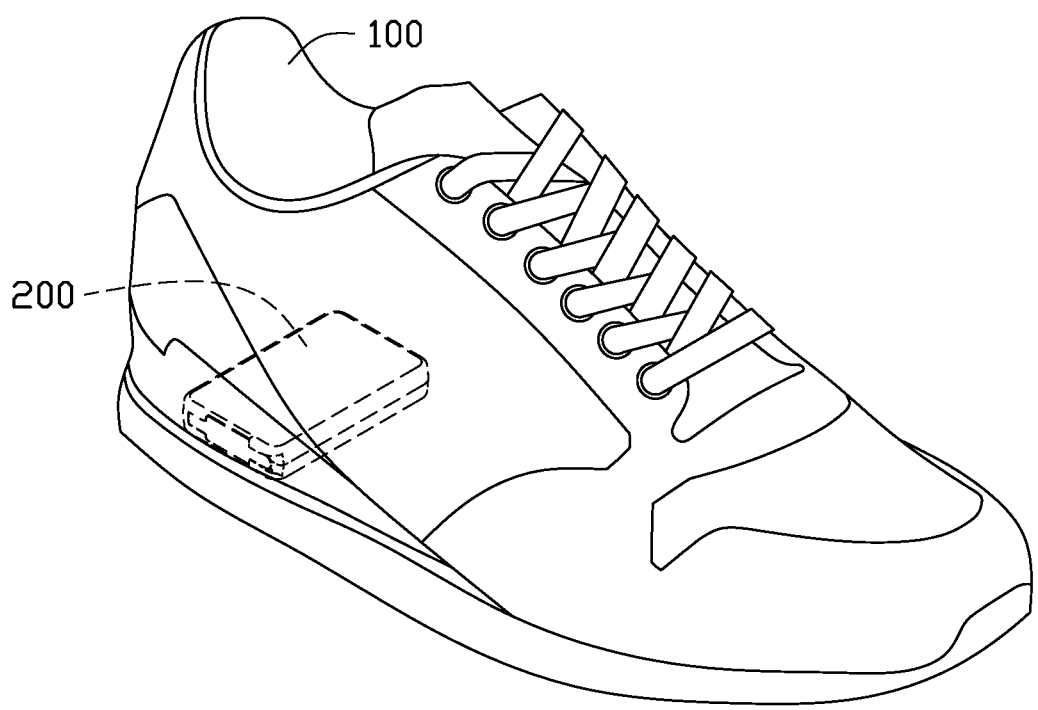
FIG. 1 is a schematic perspective view of an embodiment of a smart module shown inside a shoe.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

FIG. 1 is a schematic perspective view of an embodiment of a smart module shown inside a shoe. In FIG. 1, a smart module 200 is detachably integrated inside a heel portion of a sole of a shoe 100. The smart module 200 is modular in design, allowing easy installation and removal from the shoe 100 for charging, upgrade or replacement. The smart module 200 may be configured to record movement, distance/displacement, speed, and direction of a user using, e.g., positioning sensors and/or GPS devices. The smart module 200 can also be capable of establishing data connection with other devices such as smartphones or tablets wirelessly, so as to provide the user real time movement information through an app on the device.

Figure 2:
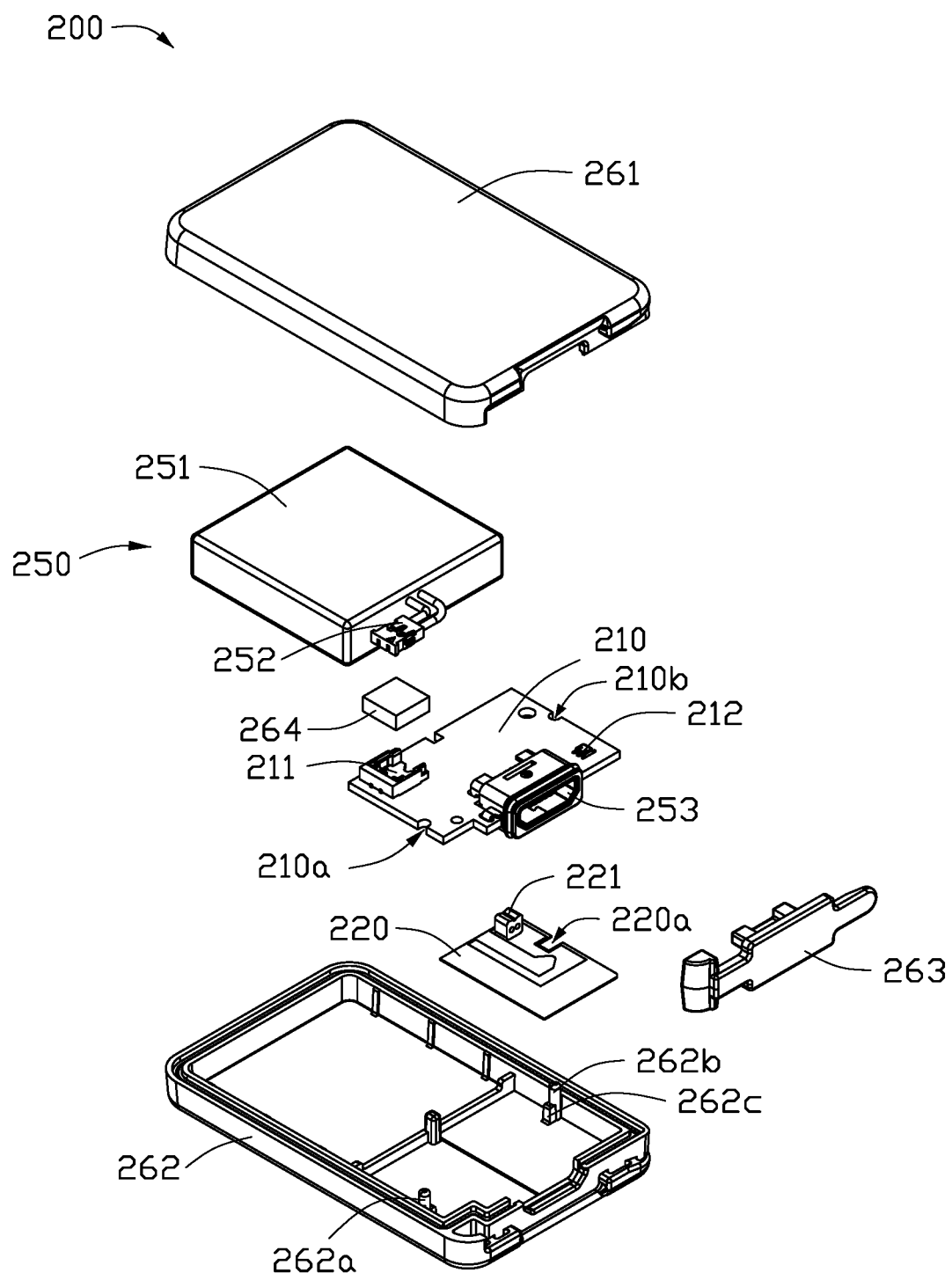
FIG. 2 is a schematic exploded perspective view of a smart module in accordance with some embodiments of the instant disclosure.
Figure 3:
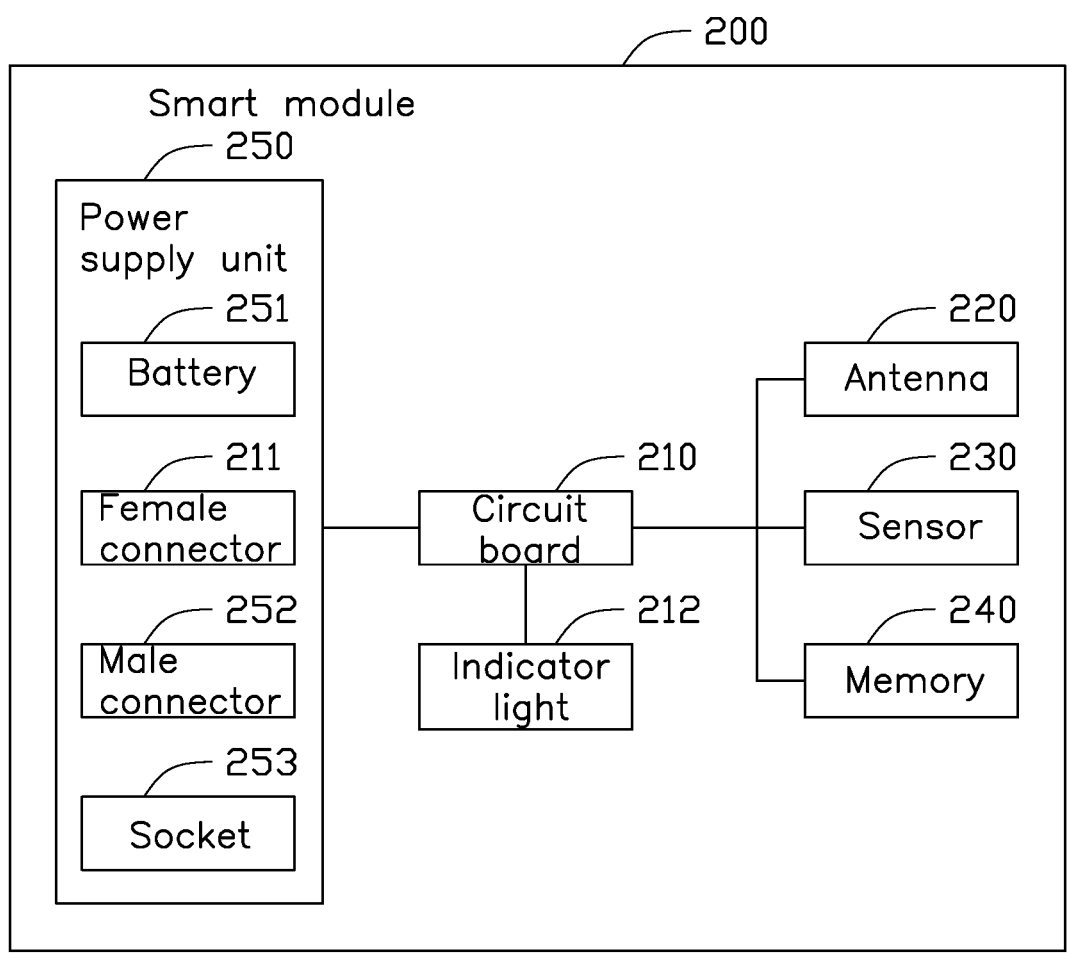
FIG. 3 is a functional block diagram of a smart module in accordance with some embodiments of the instant disclosure.

In FIGS. 2 and 3, the smart module 200 includes a first cover (e.g., a bottom cover) 262, a second cover (e.g., a top cover) 261, an antenna 220, a circuit board 210, and a power supply unit 250.

The first cover 262 includes at least one positioning member. The second cover 261 is configured/shaped to cooperate with the first cover 262 to form a housing having a housing interior for receiving the antenna 220, the control board 210, and the power supply unit 250. The housing may be made of material with sufficient resiliency, to ensure shock absorbing characteristics, which may enhance durability and wearer comfort. The housing may be configured to be water proof upon assembly, to prevent moisture damage to the electronic components housed therein.

The antenna 220 is electrically connected to the circuit board 210 through, e.g., a conductive rubber 221. The conductive rubber 221 may be attached to the antenna 220 through suitable coupling arrangement, such as adhesive. The antenna 220 includes at least one positioning hole for aligning with and receiving the positioning member of the first cover 262. The antenna 220 is made of a conductive structure such as a copper sheet. The antenna 220 may be a GPS antenna, a Bluetooth (BT) antenna, or a radio frequency (RF) antenna. The antenna 220 may be connected to a GPS receiver to obtain positional information of the user.

The circuit board 210 is disposed above the antenna 220. The circuit board 210 includes at least one positioning hole for aligning with and receiving the positioning member of the first cover 262.

In some embodiments, the first cover 262 includes a first positioning member 262c, a second positioning member 262b, and a third positioning member 262a. The antenna 220 includes a positioning hole 220a for aligning with and receiving the first positioning member 262c and the second positioning member 262b of the first cover 262. The circuit board 210 includes a first positioning hole 210b and a second positioning hole 210a for aligning with and receiving the second positioning member 262b and the third positioning member 262a of the first cover 262. The positioning holes 220a, 210b, 210a in the antenna 220 and the circuit board 210 align with and receive the positioning members 262c, 262b, 262a to ensure that the antenna 220 and the circuit board 210 are mounted at appropriate locations in the first cover 262. Therefore, the smart module 200 facilitates easy assembly and the yield of the smart module 200 can be increased.

Figure 4:
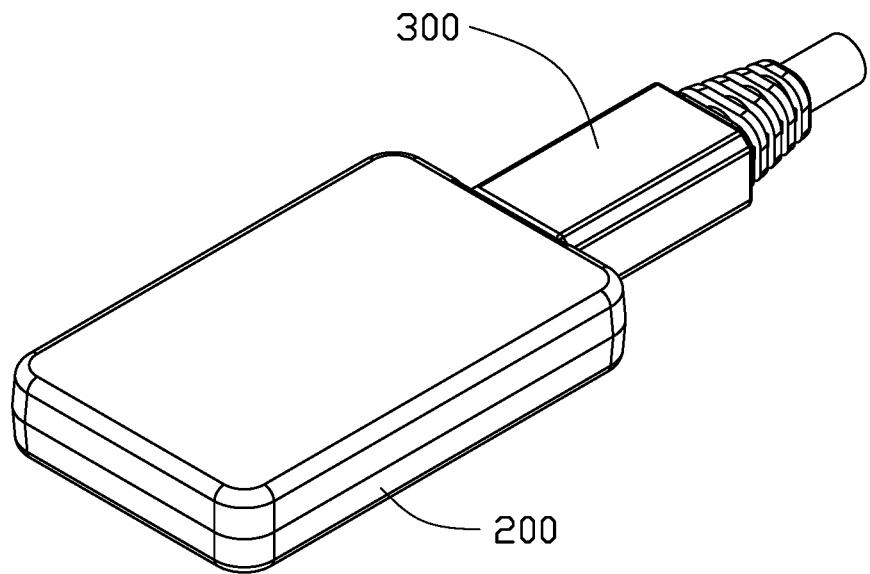
FIG. 4 is a schematic perspective view of the smart module connected to a cable plug in accordance with some embodiments of the instant disclosure.

The power supply unit 250 supplies power to the circuit board 210 and the antenna 220. The power supply unit 250 includes a battery 251, a female connector 211, a male connector 252, and a socket 253. The female connector 211 is electrically connected to the circuit board 210. The male connector 252 is attached to the battery 251. The battery 251 is electrically connected to the circuit board 210 by the male connector 252 engaging the female connector 211. An indicator light 212 is electrically connected to the circuit board 210 to indicate a charge status of the battery 251. When the battery 251 is being charged, the indicator light 212 is red. When the battery 251 is fully charged, the indicator light 212 is green. The indicator light 212 may be an LED device. The socket 253 is electrically connected to the circuit board 210, and is adjacent to a side edge of the first cover 262. The socket 253 may be a USB socket or a micro-USB socket. In FIG. 4, a cable plug 300 connected to a power supply or other devices (not shown) is plugged into the socket 253 for charging or upgrading the smart module 200.

FIG. 2 is a schematic exploded perspective view of a smart module in accordance with some embodiments of the instant disclosure. In FIG. 2, the antenna 220, the circuit board 210, and the power supply unit 250 are firmly held in place by the first cover 262 and the second cover 261 to avoid displacement/misalignment, thereby improving the durability of the smart module 200. Additionally, a sponge 264 is attached to the second cover 261 by, e.g., an adhesive, and abuts the female connector 211 and the male connector 252. The sponge 264 provides shock absorbing properties to prevent the male connector 252 from disengaging from the female connector 211.

The smart module 200 further includes an openable socket cover 263 for selectively covering the socket 253. When the socket cover 263 is open, the socket 253 is uncovered to allow insertion of the cable plug 300 into the socket 253. When the socket cover 263 is closed, the socket 253 is covered to prevent dust or moisture from entering the socket 253. The socket cover 263 is made of an elastic material. The first cover 262 and the second cover 261 are made of a plastic material. The second cover 261, the first cover 262, and the socket cover 263 form a waterproof and dustproof housing to protect the internal components.

FIG. 3 is a functional block diagram of a smart module in accordance with some embodiments of the instant disclosure. As shown in FIG. 3, the smart module 200 further includes a sensor 230 and a memory 240. The sensor 230 and the memory 240 are electrically connected to the circuit board 210. The sensor 230 may include a combination of accelerometer (G sensor) and gyro sensor. The accelerometer can calculate the number of walking steps or running steps of the user by detecting changes in acceleration during walking or running. The gyro sensor can detect the direction the user is moving. The memory 240 can store the movement information.

FIGS. 5A-5G show assembly process of an exemplary smart module 200.

Figure 5A:
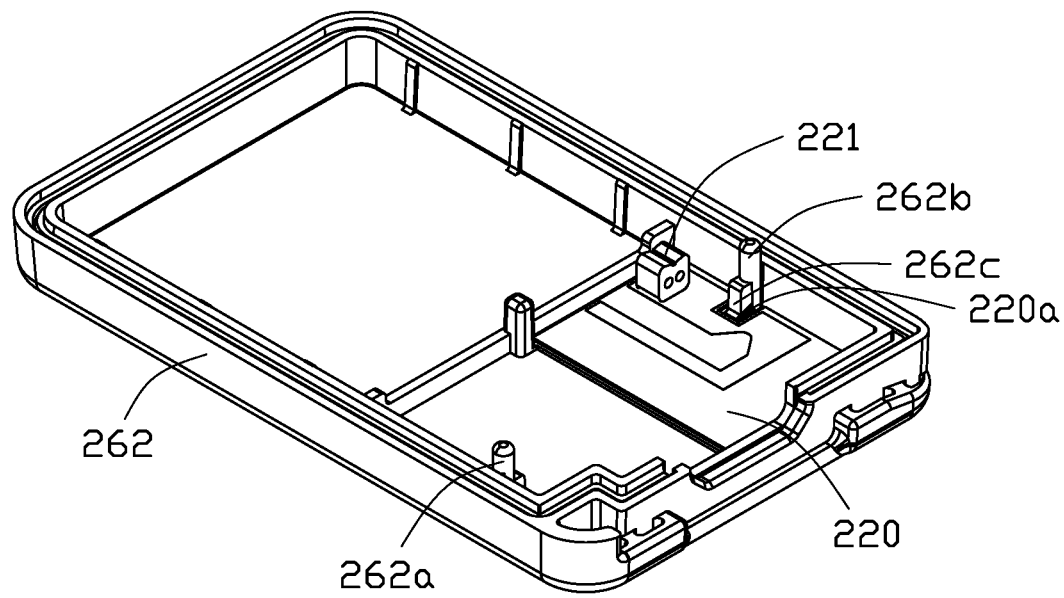
FIGS. 5A-5G are schematic perspective views of assembly processes of a smart module embodiment.

In FIG. 5A, the antenna 220 with the conductive rubber 221 is mounted in the first cover 262. The positioning hole 220*a* in the antenna 220 aligns with and receives the first positioning member 262*c* and the second positioning member 262*b* of the first cover 262. The antenna 220 can be attached to the first cover 262 by an adhesive, and the antenna 220 is confirmed to be flat.

Figure 5B:
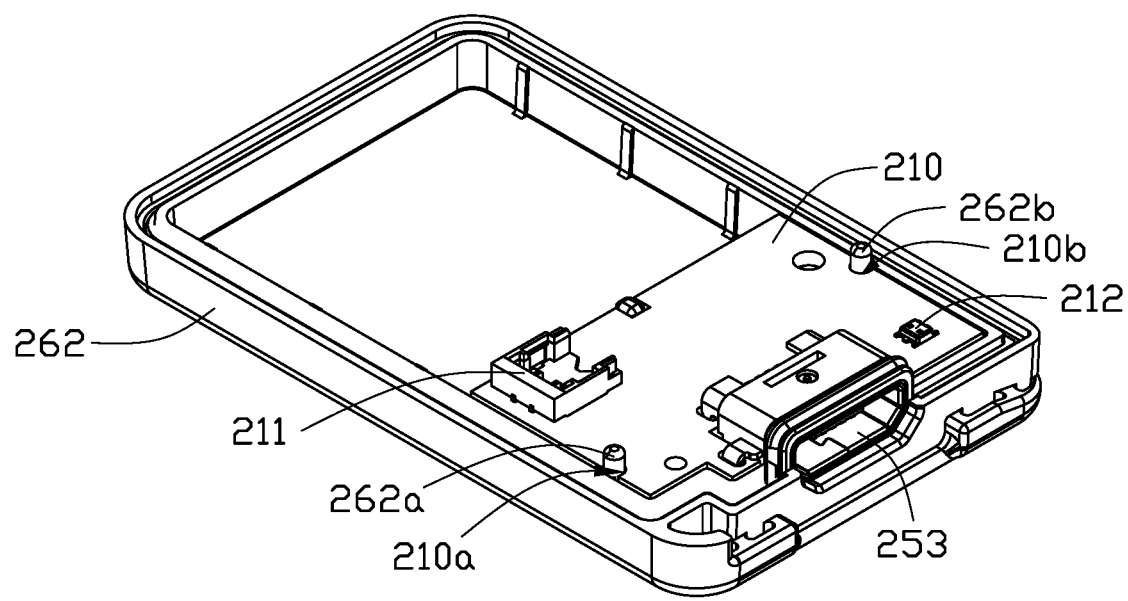

In FIG. 5B, the circuit board 210 with the female connector 211, the socket 253, and the indicator light 212 is mounted in the first cover 262, and is disposed above the antenna 220 to connect to the conductive rubber 221. The first positioning hole 210*b* and the second positioning hole 210*a* in the circuit board 210 align with and receive the second positioning member 262*b* and the third positioning member 262*a* of the first cover 262.

Figure 5C:
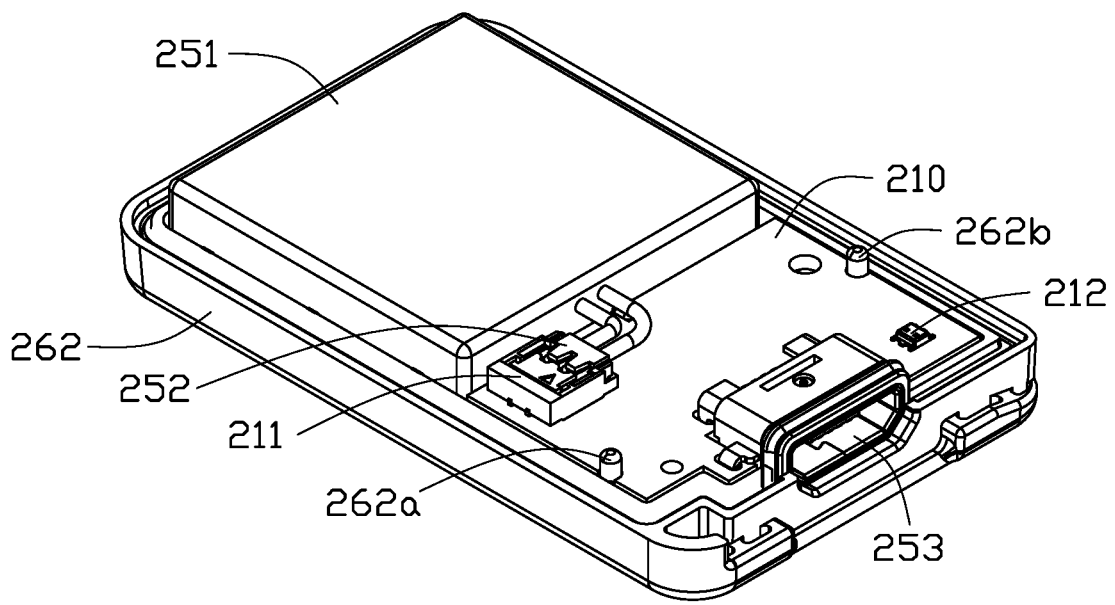

In FIG. 5C, the battery 251 with the male connector 252 is mounted in the first cover 262. The battery 251 is adjacent to the circuit board 210, and the male connector 252 engages the female connector 211. A bottom of the battery 251 can be attached to the first cover 262 by an adhesive.

Figure 5D:
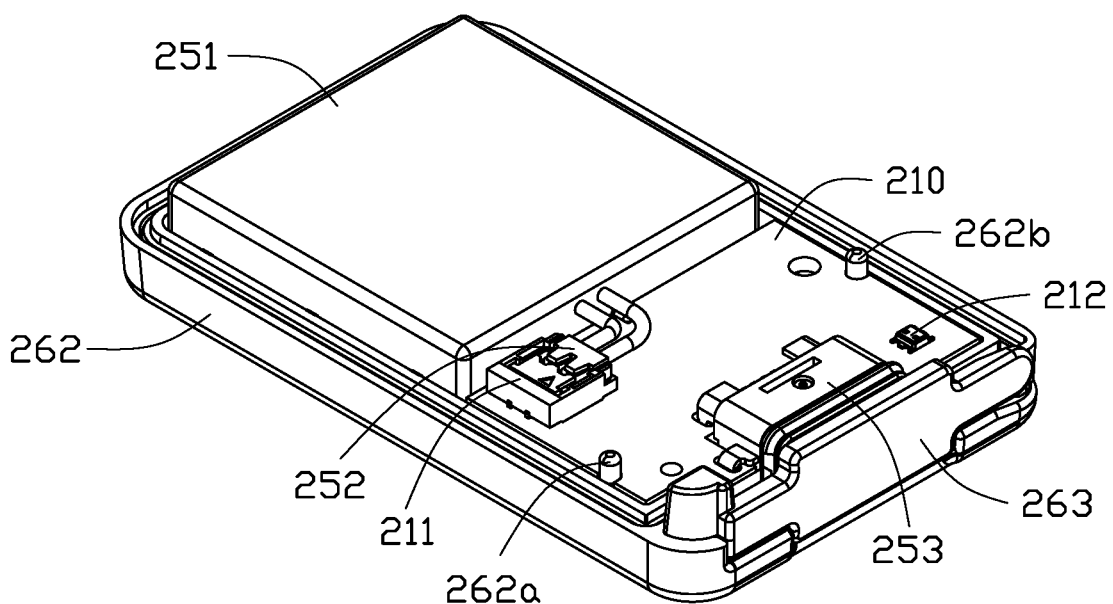

In FIG. 5D, the socket cover 263 is mounted on the side edge of the first cover 262 to cover the socket 253.

Figure 5E:
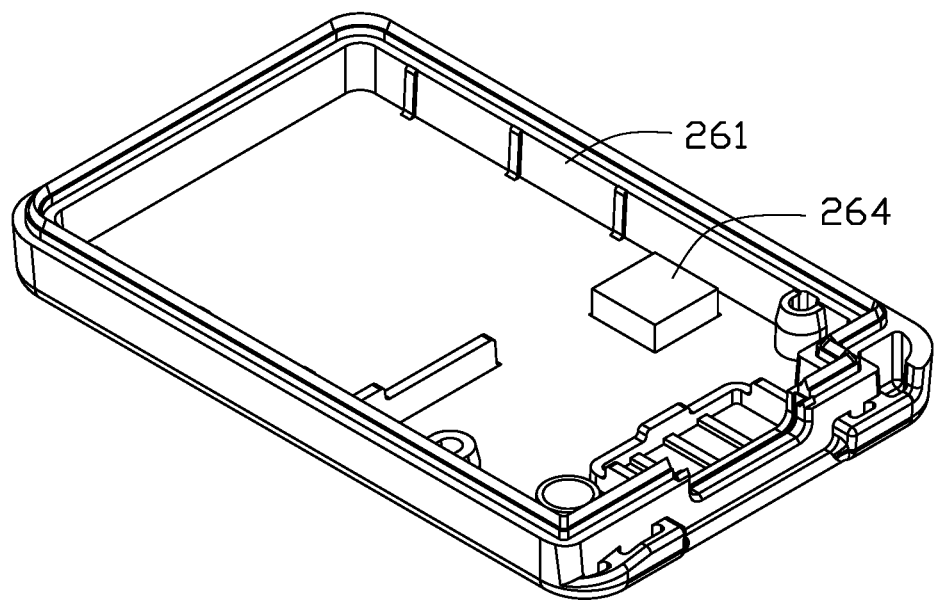

In FIG. 5E, the sponge 264 is mounted in the second cover 261.

Figure 5F:
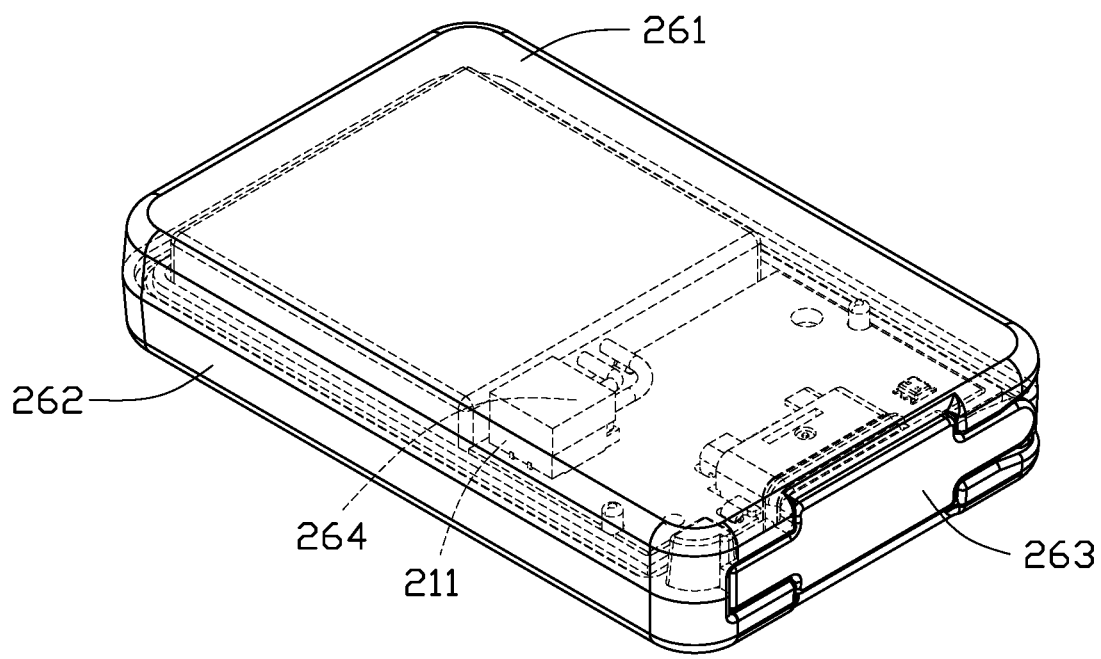

In FIG. 5F, the second cover 261 with the sponge 264 covers the first cover 262, and the sponge 264 abuts the female connector 211 and the male connector 252.

Figure 5G:
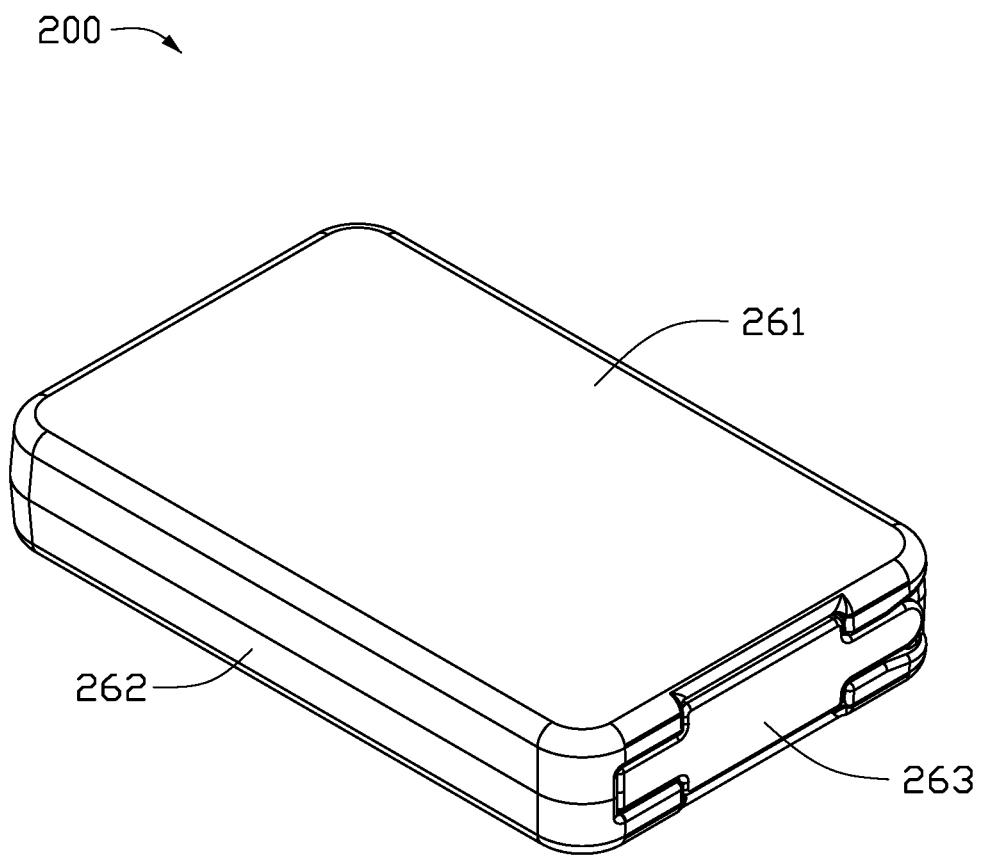

In FIG. 5G the second cover 261 and the first cover 262 are secured together by ultrasonic welding, thereby completing the assembly.

The embodiments shown and described above are only examples. Many details are often found in this field of art thus many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A smart module installable in a shoe, the smart module comprising:

a first cover comprising at least one positioning member;

a second cover cooperating with the first cover to form a housing having a housing interior;

an antenna mounted in the housing interior, and the antenna comprising at least one positioning hole for aligning with and receiving the positioning member of the first cover;

a circuit board mounted in the housing interior, and the circuit board comprising at least one positioning hole for aligning with and receiving the positioning member of the first cover; and a power supply unit mounted in the housing interior, and the power supply unit supplying power to the circuit board and the antenna;

wherein the antenna and the power supply unit are electrically connected to the circuit board;

the power supply unit comprises: a battery; a female connector electrically connected to the circuit board; and a male connector attached to the battery; and a sponge is attached to the second cover, and the sponge abuts the female connector and the male connector.

2. The smart module of claim 1, wherein the first cover comprises a first positioning member, a second positioning member, and a third positioning member;

wherein the antenna comprises a positioning hole for aligning with and receiving the first positioning member and the second positioning member of the first cover; and wherein the circuit board comprises a first positioning hole and a second positioning hole for aligning with and receiving the second positioning member and the third positioning member of the first cover.

3. The smart module of claim 2, wherein the power supply unit further comprises a socket electrically connected to the circuit board, and the battery electrically connected to the circuit board by the male connector engaging the female connector.

4. The smart module of claim 3, further comprising a socket cover for selectively covering the socket.

5. The smart module of claim 3, wherein the antenna is electrically connected to the circuit board through a conductive rubber.

6. The smart module of claim 2, wherein the antenna is electrically connected to the circuit board through a conductive rubber.

7. The smart module of claim 2, wherein an indicator light is electrically connected to the circuit board to indicate a charge status of the power supply unit.

8. The smart module of claim 2, further comprising a sensor electrically connected to the circuit board.

9. The smart module of claim 1, wherein the power supply unit further comprises a socket electrically connected to the circuit board,
and the battery electrically connected to the circuit board by the male connector engaging the female connector.

10. The smart module of claim 9, further comprising a socket cover for selectively covering the socket.

11. The smart module of claim 9, wherein the antenna is electrically connected to the circuit board through a conductive rubber.

12. The smart module of claim 9, wherein an indicator light is electrically connected to the circuit board to indicate a charge status of the battery of the power supply unit.

13. The smart module of claim 9, further comprising a sensor electrically connected to the circuit board.

14. The smart module of claim 1, wherein the antenna is electrically connected to the circuit board through a conductive rubber.

15. The smart module of claim 1, wherein an indicator light is electrically connected to the circuit board to indicate a charge status of the power supply unit.

16. The smart module of claim 1, further comprising a sensor electrically connected to the circuit board.

* * * * *